United States Patent Office 3,440,147
Patented Apr. 22, 1969

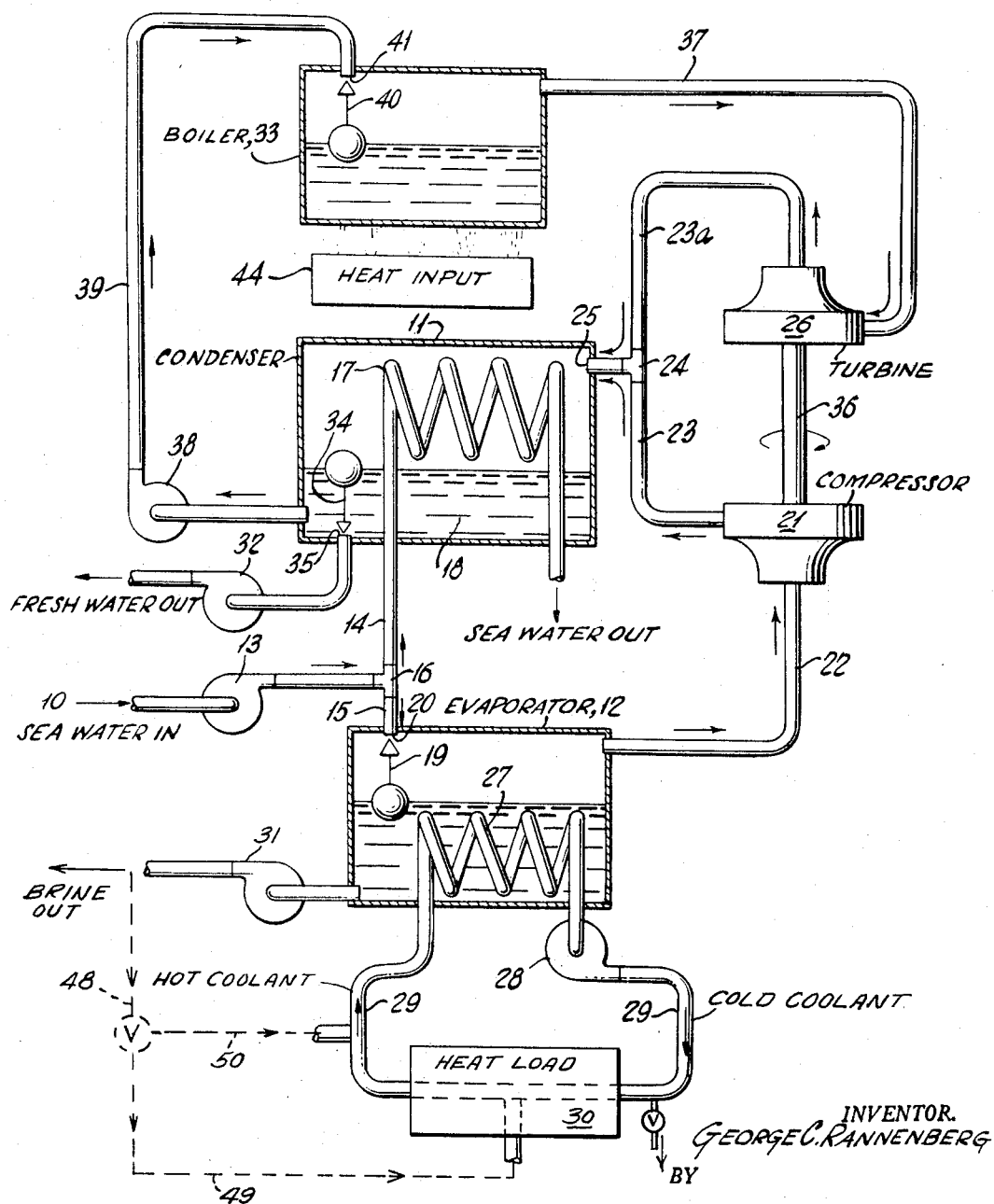

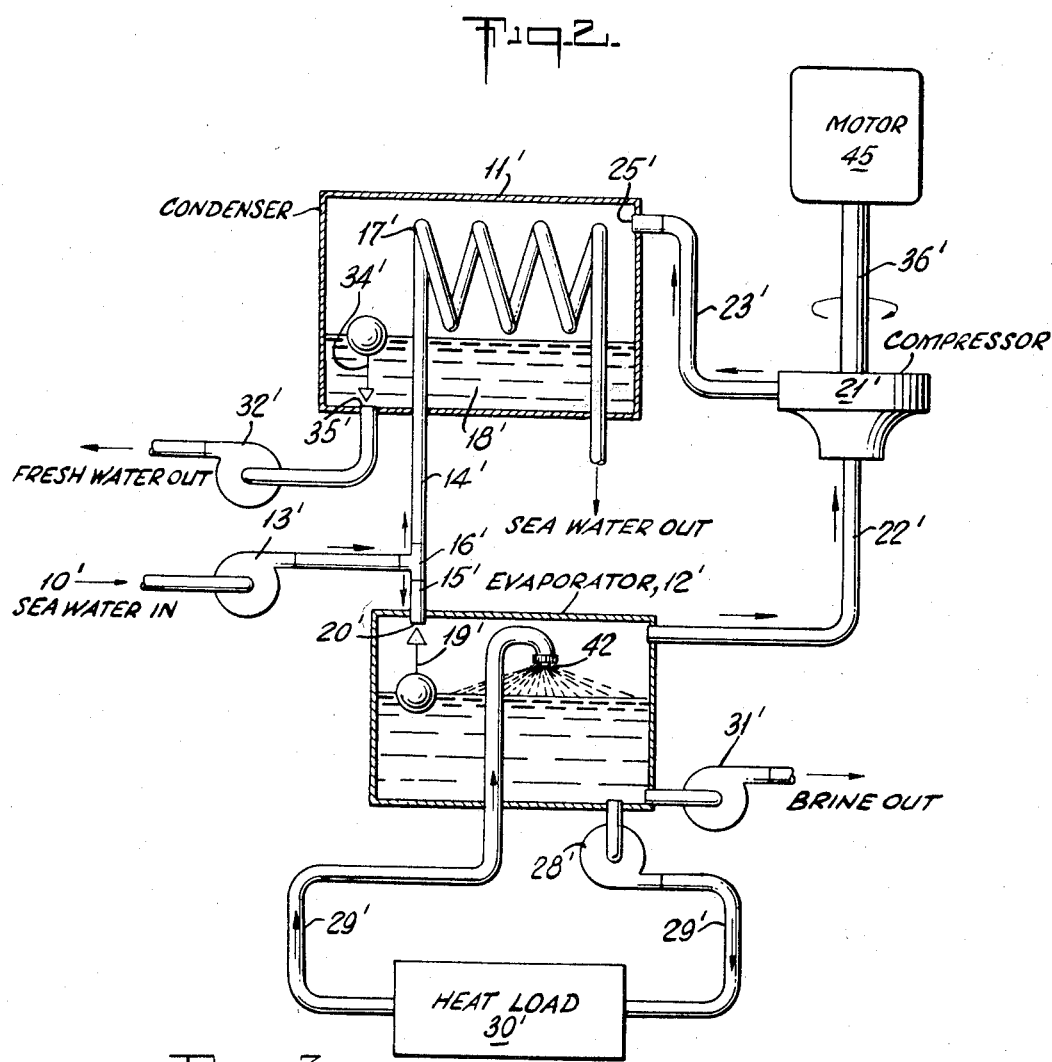
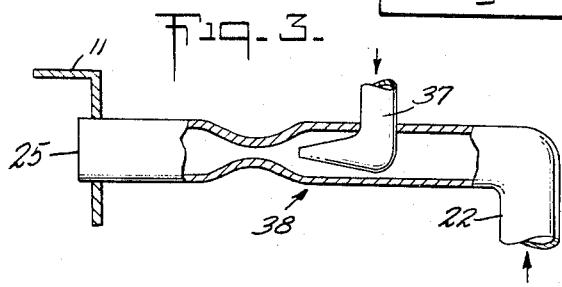

3,440,147
COMBINED HEAT LOAD COOLER AND SEA
WATER DESALINATION STILL
George C. Rannenberg, East Granby, Conn., assignor to
United Aircraft Corporation, East Hartford, Conn., a
corporation of Delaware
Filed July 14, 1966, Ser. No. 565,197
Int. Cl. C02b 1/06; B01d 3/06
U.S. Cl. 203—11                                     2 Claims

ABSTRACT OF THE DISCLOSURE

Sea water or contaminated water is divided into a first stream which is partially vaporized and the residue discarded, and a second stream which condenses the produced vapor by indirect heat exchange therewith. The vaporization is brought about by a closed heat transfer loop in which heat is indirectly absorbed from a heat load at one loop point and the heat absorbed surrendered to said vaporization at another loop point.

This invention relates to refrigeration and water desalinization, and more particularly to systems and means for providing both properties together.

In many climates and environments there is great need for systems which serve to lower a temperature. In many of these environments there is also a great need for fresh water; as an example, consider the situation where there is an abundant supply of sea water, but little available fresh water. A typical situation is a desert region or a submarine. A refrigeration system is required for cooling various parts of a submarine which may become overheated, e.g., a nuclear reactor plant. At the same time sea water must be converted to fresh water for drinking and other purposes. Normally the submarine does not have sufficient capacity for storing the large amounts of fresh water required for long voyages. Attempts have been made in the past to build combined refrigerator and fresh water plants; but for a variety of reasons, these attempts have not been satisfactory.

It is an object of this invention to provide refrigeration means, both system and process, in which sea water or other contaminated water is used as a refrigerant, with fresh water being extracted from the system as a byproduct with little additional energy consumption.

Most refrigeration systems include a compressor, an ejector, or an equivalent mechanism for controlling the operation of an evaporator or flash tank. The power input to the compressor, ejector, etc. can be derived from a number of sources. In the past electrically-driven motors and steam engines have been used. Steam engines are particularly advantageous in embodiments of the inventions herein, because both the refrigeration and steam engine loops in the overall system use the same liquid and consequently the same condenser may be used in both the steam engine loop of the system and the refrigeration loop of the system. In the past, steam engines have been found objectionable for two reasons as a source of motive power. First, the water which is boiled must be fresh; if it contains salts, the boiler efficiency will deteriorate rapidly in the course of operation. And since a practical system is always slightly leaky, a fresh water supply must be available. Second, the boiler in the steam engine loop must be heated and the heating system may add substantially to both the initial and operating costs of the system.

It is another object of this invention, in the illustrative embodiments thereof, to provide a double-loop system in which the motive power for the refrigeration loop is derived from a steam engine loop, with the boiler in the steam engine being heated by available heat (e.g., that in a submarine nuclear reactor), and with the two loops being interrelated and sharing common equipment in a manner such that the refrigeration loop supplies fresh water as a byproduct which in addition to external consumption is used in the steam engine loop of the system.

To appreciate the problems encountered when an attempt is made to combine refrigeration and desalinization plants, reference may be made to U.S. Patent 2,423,-307, issued to W. G. Fraser, Jr., et al., and entitled "Steam Jet Refrigeration Apparatus." In this system "raw make-up water" is first boiled to obtain desalinized steam. The steam is condensed and then cooled in a flash tank, the latter two functions being accomplished by a condenser, flash tank and ejector. The resulting purified water collected in the flash tank is not only pure but cooled as well. The major problem with such a system is that "raw make-up water" is converted to steam in a boiler. It is well known that distillation at elevated temperatures may cause internal damage due to chemical buildup if the raw water contains dissolved salts. Moreover, the fresh water output, while cool, is not achieved as a byproduct of the refrigeration cycle free of additional energy consumption. The first step in the process is to obtain pure water through boiling. The steam is then cooled in a separate refrigeration system. In the Fraser et al. system the steam engine and refrigeration loops are not interrelated except insofar as the steam output is the input to the refrigeration plant. The system requires considerable energy consumption in its operation, and because the distillation occurs at high temperatures it may become inoperative when in use due to precipitating salts on the hot surfaces.

In accordance with the principles of the inventions herein distillation takes place in a refrigeration cycle. Relatively warm sea water is fed to an evaporator. A compressor delivers low pressure desalinated water vapor to a condenser at higher pressure. The fresh water vapor in the condenser condenses and may be tapped off for external use. The coolant in the refrigeration loop is cooled in the evaporator. The compressor itself is driven by a steam turbine. Fresh water, derived from the condenser, is boiled, and then circulated to drive a turbine, after which the water is returned to the condenser.

This overall system design is advantageous for a number of reasons. Foremost among these is that only fresh water is used in the steam engine loop; whereby the boiler operation does not deteriorate by reason of salt contaminants in the boiled water. There is no need for an external fresh water supply to replenish the boiler supply, because fresh water is continuously available from the condenser, and the same condenser serves in both the steam engine and refrigeration loops. The boiler may be heated by any heat source including any available "waste heat"; consequently, electrical power is not required for driving the compressor. Sea water is used as the refrigerant in the refrigeration process; and as a byproduct of the evaporation process (which occurs at low temperatures), fresh water is purveyed for human consumption without impairing the overall system operation.

It is a feature of this invention to provide refrigeration means, both system and process, in which sea water serves as the refrigerant, with the fresh water obtained during the evaporation process being utilized for external consumption.

It is another feature of this invention to control the operation of the refrigeration system with the use of a steam engine, the fresh water obtained as a byproduct in the refrigeration process also being used in the steam engine cycle.

Further objects and advantages will become apparent from the following description of the invention taken in conjunction with the figures, in which:

FIG. 1 shows schematically a first illustrative embodiment of the invention; and FIG. 2 shows schematically other illustrative embodiments of the invention;

FIG. 3 is a partial schematic drawing of an embodiment utilizing an ejector in place of the turbine-compressor arrangement.

Reference is made to the embodiment of the invention depicted in FIG. 1. Sea water 10 is pumped into both condenser means 11 and evaporator means 12 by a pump 13 via conduits 14, 15 interconnected by a T 16. Conduit 14 feeds sea water 10 through condenser coils 17, thereby causing the hot water vapor in condenser 11 to convert into a liquid form depicted as 18. The vapor in condenser 11 has a saturation temperature higher than that of sea water 10. Consequently, the continuous flow of sea water 10 through condenser coils 17 regulates the condensing process.

When the sea water 10 in evaporator 12 falls below a predetermined level, a float valve 19 drops so as to open and evaporator inlet port 20, whereby the pumped sea water 10 also feeds into evaporator 12. When float 19 rises above said predetermined level, port 20 is closed to block further feed of water 10 into evaporator 12. The foregoing arrangement including float valve 19 insures that the refrigerant sea water 10 in evaporator 12 is maintained at a preselected level.

A compressor 21 pulls the low pressure vapor from evaporator 12 via a conduit 22, compresses said vapor and delivers same at a higher pressure to condenser 11 via a conduit 23 and a T interconnection 24 to a condenser inlet port 25. The high pressure vapor together with the steam output from a turbine 26 is liquefied in condenser 11. Steam from turbine 26 feeds into condenser 11 via a conduit 23a and T 24 through port 25. As compressor 21 draws off vapor from evaporator 12, the sea water 10 therein boils to replenish vapor in evaporator 12.

As sea water 10 boils in evaporator 12, the contaminants, i.e., the salts, in such water are left behind as residue. Thus, only a purified vapor feeds into condenser 11 via compressor 21. In addition, as such sea water boils or converts to vapor in evaporator 12, heat is drawn from the heat load coolant pumped through its coils 27 by pump means 28. The refrigeration loop is depicted as conduit 29 and has coolant coils 27 submerged in sea water 10 contained in evaporator 12. The system to be refrigerated is shown symbolically as a head load 30. The coolant temperature rises as it flows through and cools heat load 30, whereby the warmer coolant is pumped up into the left side of evaporator 12 wherein it loses heat upon flow through coils 27 and thereby resulting in a lower coolant temperature as it circulates through evaporator 12 and again to load 30. Consequently, the continuous drawing off of heat from the circulating coolant by evaporating sea water 10 purveys the refrigeration properties of the system.

As shown in FIG. 1, the excessive brine or other contaminants accumulating in evaporator 12 is pumped therefrom by pump means 31 back into the sea or other suitable depository. The capacity of pump 31 is selected, whereby the density of the salt in the solution 10 in evaporator 12 does not exceed tolerable limits. As the brine pumps out from evaporator 12, pump 13 supplies additional sea water 10 to evaporator 12 via port 20. It should be understood that the capacity of pump 31 should not be excessively great. The incoming fresh sea water 10 fed into evaporator 12 via port 20 is considerably warmer than the brine or liquid 10 pumped out from evaporator 12 via pump 31; moreover, the cooler the latter liquid, the more efficient will be the refrigeration cycle. Nevertheless, the brine must be drawn out of evaporator 12 to prevent salt buildup from interfering with evaporator 12 and the refrigeration system. In any event, the capacity of pump 31 is selected to prevent excessive contaminant salt concentrations in evaporator 12, but not that great in pump capacity to degrade the refrigeration efficiency of the system. Since the brine output from pump 31 is much cooler in temperature than the circulating coolant fed into the lefthand side of cooling coils 27, it is a further advantage of the invention to conduct the output from pump 31 back around or into the coolant loop 29, for example, into or around load 30 or to the left of load 30 via lines 48 and 49. This arrangement serves to precool the coolant and increases slightly the efficiency of the system via lines 48 and 50.

While most refrigeration systems require the refrigerant in evaporator 12 to be conserved, such is not the case for the inventions claimed herein. One essential object of the inventions herein is refrigerating the coolant and purveying purified water for human consumption as a byproduct. In the FIG. 1 embodiment, the refrigeration plant utilizes sea water 10 as the refrigerant. The condensed fresh water 18 collected in condenser 11 is available for drinking and other purposes. Pump means 32 is generally necessary for pumping the fresh water 18 out of condenser 11, when the pressure in the condenser is less than the ambient pressure. The level of fresh water 18 should not fall below a predetermined depth in condenser 11, because of the need for supplying fresh water to boiler means 33 as described hereinafter. For this reason, the level of water 18 in condenser 11 is controlled by a floating valve 34 which regulates a port 35 when water 18 falls below a preselected level.

Consider for example prior art systems specifically designed to provide fresh water, one finds that some of the fresh water is returned to the evaporator. This is essential where the refrigerant has to be conserved. In the inventions claimed herein, the refrigerant is sea water 10 and an abundant supply is available. Moreover, it is preferable not to return warm fresh water 18 to evaporator 12, because the temperature of the fresh water 18 is very much higher than the sea water 10 fed to evaporator 12. Refrigeration system efficiency is downgraded if the high temperature fresh water 18 is introduced into evaporator 12.

A turbine 26 supplies motive power by means of a shaft 36 to compressor 21. Turbine 26 in turn is driven by a high pressure steam jet from boiler means 33 via a conduit 37. A conventional ejector device 38 as shown in FIG. 3 may be used instead of the illustrated and described turbine-compressor arrangement. The output steam exhausting from turbine 26 via conduit 23a is at the same pressure as the output steam vapor exhausting from compressor 21 via conduit 23, whereby the combined mixture is fed to condenser 11 via interconnecting T 24. From the foregoing it is seen that the lowest pressure in the steam engine loop is the turbine output pressure; and that the highest pressure in the refrigeration loop is the compressor output pressure; and both of the aforesaid output pressures are essentially equal.

The input steam fed into condenser 11 is cooled by sea water 10 circulating through coils 17, which steam condenses to fresh water 18. Second pump means 38 whose inlet is connected to condenser 11 provides fresh water fed via conduit 39 to the top of boiler 33. Floating valve means 40 for regulating boiler port 41 prevents an overfeed of much water 18 to the boiler and thus maintains water 18 in the boiler at a predetermined level. From the foregoing it is seen that fresh water 18 is delivered to boiler 33, and that there are two fresh water vapor inputs to condenser 11, one from compressor 21 and the other from turbine 26. Since only fresh water 18 is delivered to boiler 33, the turbine output is similarly fresh water 18; and since only distilled vapor is pulled up from evaporator 12 by compressor 21, a fresh water supply 18 accumulates in condenser 11. The foregoing arrangement maintains enough fresh water 18 available for boiler operation of turbine 26 because steam leakage is minimal.

Essentially, all of the distilled fresh water 18 is thus available for external human consumption.

The heat input for boiler 33 is depicted by reference 44. A separate heat supply 44 may be used if required. In many applications purveying refrigeration and fresh water, there is a readily available heat supply. The use of available "waste heat" is an attractive feature of the double-loop system of FIG. 1. The combined refrigeration and desalinization operation can be achieved by use of a motor 45 for operating compressor 21', see FIG. 2. With the available "waste heat" used to advantage the capacity of the refrigeration plant may be relatively decreased.

The elements in FIG. 2 corresponding to those of FIG. 1 are similarly numbered. In FIG. 2, turbine 26 and boiler 33 and the associated conduits are eliminated. The motive power is now supplied by a motor 45 to drive compressor 21'. Motor 45 may be gas, electric or of another type depending upon the circumstances of the environment. Otherwise, the system operation is the same as previously described. Evaporator 12' is provided with two output pumps 28' and 31'. The brine output pump 31' serves to limit the brine concentration in evaporator 12'. As the salt concentration increases in evaporator 12', the brine is pumped into the sea and additional sea water 10' is supplied by pump 13'. As described hereinbefore, the pump 31' should not exhaust too much brine to secure good system efficiency. Pump 28' serves to control the coolant flow through heat load 30'. The pressure developed by pump 28' should be sufficient to overcome the friction loss in the cooling system loop.

A portion of the system piping is at a pressure below ambient or atmospheric, hence there may be air leakage into the system. Also, air may be introduced to the system by the incoming sea water 10' itself. Consequently, there may be an air buildup in condenser 11'. Any one of many well known techniques may be used for the purpose of air removal to secure proper system performance.

It is also within the spirit of the invention to use an ejector as known in the art, wherein the boiler steam output flows through the ejector and mixes same with the low pressure vapor from evaporator 12 for delivery to condenser 11 as shown in FIG. 3. Consider another modification shown in the embodiment of FIG. 2. This system eliminates coolant tubing 27 in evaporator 12'. Without tubing 27 the "evaporator" operates as a "flash tank" 12'. In FIG. 1, while the refrigerant is sea water 10, the coolant may be other than sea water. However, if sea water is used to cool load 30, it is not necessary to isolate the refrigerant and the coolant. Sea water is a good coolant, because it has a lower freezing point than fresh water, and consequently sea water is less likely to freeze in the refrigeration pipes 27, 29. Referring to FIG. 2, for this reason the coolant is fed directly from heat load 30' through pipe 29' to evaporator 12' where it is sprayed by means 42 into the flash tank 12' and mixes with the sea water input from pump 13'. Since sea water 10' is distilled in evaporator 12' and the fresh water 18' is consumed, additional refrigerant and coolant is supplied by the regulator valve means 19', 20'. It is not necessary to return the coolant at the output of heat load 30' to evaporator 12'. Such coolant could be discharged into the sea; whereas the additional sea water required is supplied by pump 13'. However, it is often most advantageous to return such coolant to evaporator 12' to secure efficiency in the refrigeration process. Although the coolant temperature is raised by heat load 30', it is still lower in temperature than that of the sea water. Consequently, the coolant is recirculated in the refrigerating loop while pump 13' is operated to supply the additional sea water when required as a result of the distillation process and the brine loss via pump 31'.

It is intended that all matter contained in the above description or shown in the accompanying drawings shall be interpreted as illustrative and not in a limiting sense.

What is claimed is:

1. Apparatus for purveying separately fresh water and a coolant for refrigeration of a heat load comprising: first means for forming a closed heat exchange refrigeration loop including a heat load and a heat absorber, said heat load comprising second means for transferring heat from said load to said coolant flowing in said loop in one region of said loop and said absorber comprising third means for cooling said coolant in another region of said loop; said absorber also having means for providing vaporous fresh water; separate means distinct and separate from said loop for indirectly condensing said vaporous fresh water to liquid water; and means for supplying contaminated water both to said separate means providing said fresh water and to said absorber for directly vaporizing said supplied contaminated water to form said vaporous fresh water.

2. Apparatus for purveying simultaneously but separately brine for refrigeration of a heat load and fresh water comprising: means for evaporating contaminated water whereby brine and vaporous fresh water are produced; means for converting said vaporous fresh water to liquid water including means for compressing said vaporous fresh water to increase its pressure and means for condening said compresed vaporous fresh water by indirect heat exchange with other unevaporated contaminated water to produce liquid water; mean for maintaining said fresh water in said condensing means at a selected level; means for boiling a portion of said fresh water to produce steam; turbine means driven by said boiler steam for driving said compressing means, the output of said turbine means going to said condensing means; means for refrigerating a heat load, including a closed loop of conduit passing through said brine of said evaporating means and also passing through said heat load and thence back to said evaporating means; and means for purveying contaminated water, one part to said evaporating means and another to said condensing means.

References Cited

UNITED STATES PATENTS

| | | | |
|---|---|---|---|
| 2,389,064 | 11/1945 | Latham | 159—24 X |
| 2,619,453 | 11/1952 | Andersen | 203—10 X |
| 2,637,684 | 5/1953 | Buffum. | |
| 2,759,882 | 8/1956 | Worthen et al. | 159—17 X |
| 2,777,514 | 1/1957 | Eckstrom | 159—47 X |
| 3,248,305 | 4/1966 | Williamson | 202—180 |
| 3,347,753 | 10/1967 | Morse | 203—11 X |

NORMAN YUDKOFF, *Primary Examiner.*

J. SOFER, *Assistant Examiner.*

U.S. Cl. X.R.

202—185, 236; 203—100

U.S. DEPARTMENT OF COMMERCE
PATENT OFFICE
Washington, D.C. 20231

UNITED STATES PATENT OFFICE
CERTIFICATE OF CORRECTION

Patent No. 3,440,147

April 22, 1969

George C. Rannenberg

It is certified that error appears in the above identified patent and that said Letters Patent are hereby corrected as shown below:

Column 6, line 24, "directly" should read -- indirectly --; line 34, "condening" should read -- condensing --; same line 34, "compresed" should read -- compressed --; line 36, "mean" should read -- means --.

Signed and sealed this 14th day of April 1970.

(SEAL)
Attest:

Edward M. Fletcher, Jr.
Attesting Officer

WILLIAM E. SCHUYLER, JR.
Commissioner of Patents